2 Sheets—Sheet 2.
C. W. EDELBLUTE.
Machine for Upsetting Tires.
No. 220,589.      Patented Oct. 14, 1879.
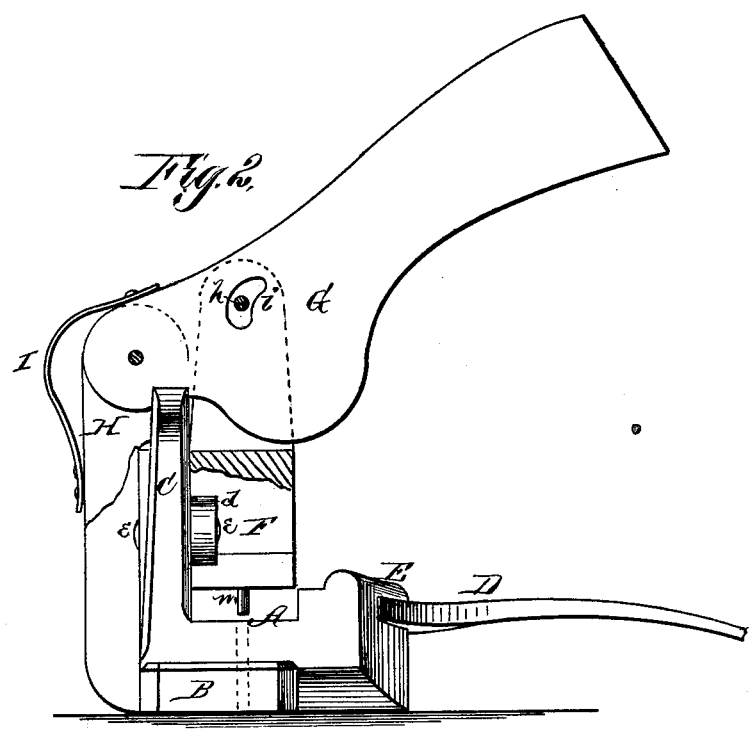

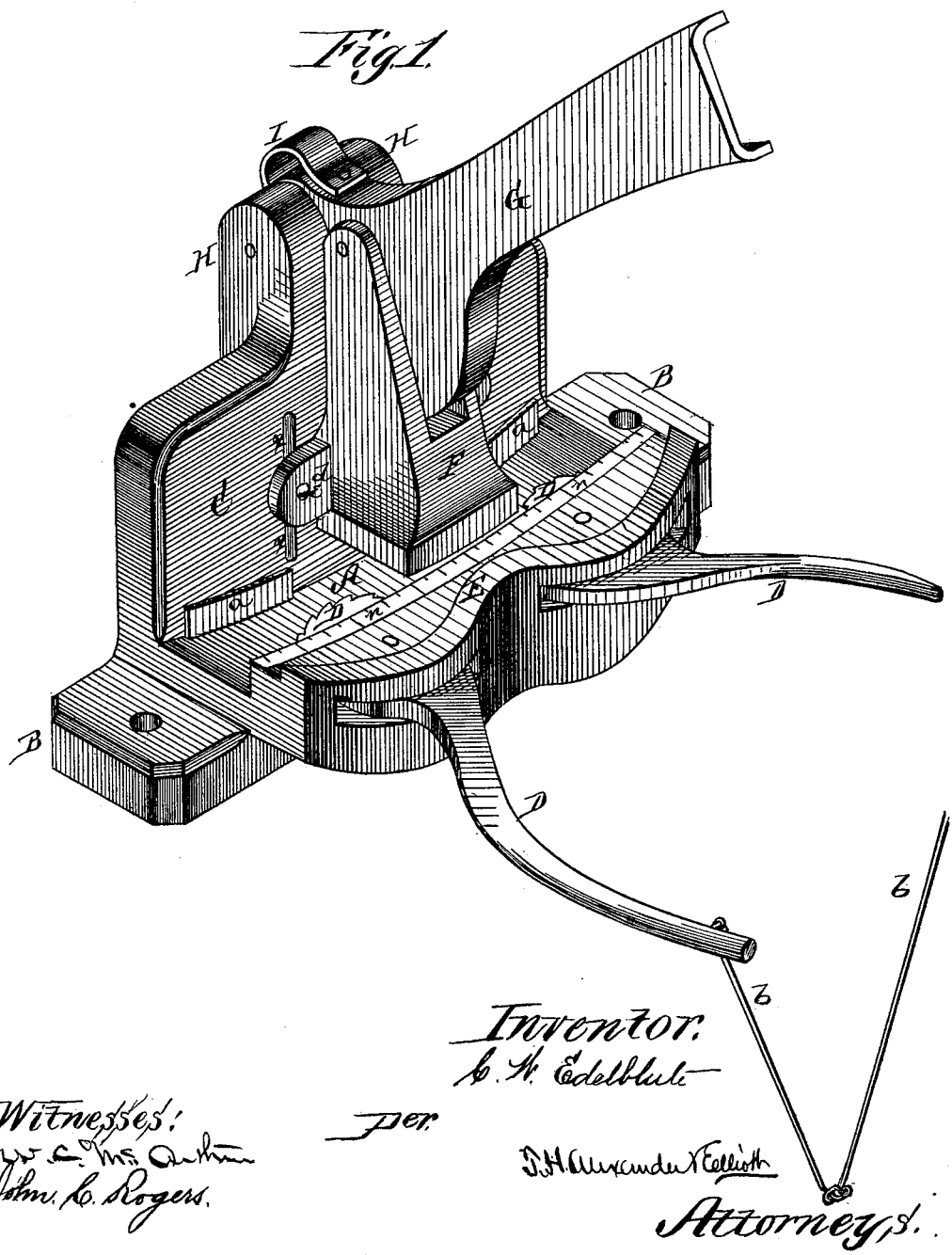

UNITED STATES PATENT OFFICE.

CHARLES W. EDELBLUTE, OF CROTON, OHIO, ASSIGNOR TO HIMSELF AND MADISON H. FROST, OF SAME PLACE.

IMPROVEMENT IN MACHINES FOR UPSETTING TIRES.

Specification forming part of Letters Patent No. 220,589, dated October 14, 1879; application filed August 2, 1879.

*To all whom it may concern:*

Be it known that I, CHARLES W. EDELBLUTE, of Croton, in the county of Licking and State of Ohio, have invented certain new and useful Improvements in Machines for Upsetting Wagon-Tires; and I do hereby declare that the following is a full, clear, and exact description thereof, reference being had to the accompanying drawings, and to the letters of reference marked thereon, which form part of this specification.

The nature of my invention consists in the construction of a machine for upsetting, punching, and bending metal, as will be hereinafter more fully set forth.

In order to enable others skilled in the art to which my invention appertains to make and use the same, I will now proceed to describe its construction and operation, referring to the annexed drawings, in which—

Figure 1 is a perspective view of my invention, and Fig. 2 is an end view, partly broken away.

A represents the bed which receives the tire or other article of metal to be operated upon. This bed is made slightly concave, and has at each end a projection or ear, B, through which bolts may pass for fastening the same to any suitable bench or other place in the shop. Along one side of the bed A is a vertical plate or back, C, which has at the bottom, near each end, serrations $a$, against which the material is fastened by means of serrated cam-levers D D. These levers are pivoted in slots in a ledge, E, that runs along the other side of the bed, and in the outer ends of said levers are attached rods $b$ $b$, which are to connect with a foot-treadle, so that they may be operated simultaneously and instantly confine the material to be operated upon.

F represents the foot, which is to be brought down on the material. The under surface of this foot is convex to correspond with the concavity of the bed, and on each side of the foot is a projection, $d$, in which is fastened a headed pin, bolt, or screw, $e$. These pins, bolts, or screws pass through vertical slots $x$ $x$ in the back C for guiding the foot in its up-and-down movement. The upper portion of the foot F is slotted or forked, and in the same works a cam-lever, G, which is pivoted between two standards, H H, formed on or attached to the back C. The foot F is connected to the lever G by a bolt or pin, $h$, which passes through an enlarged slot, $i$, in the lever. This allows the lever to move independent of the foot sufficiently far to cause the cam to work on the bottom of the slot in the foot, and thus exert pressure thereon in bringing the same down.

I is a spring attached to the lever and to the standards in such a manner as to lift the lever and foot and hold the latter elevated above the bed.

In operation a kink or bend in the tire is first made by heating the tire at the point where it is desired to be shortened and then making the bend over the point of an anvil or other tool. Now, supposing that the distance from one cam to the other on the concave bed is seven inches, by making a kink more concave in an opposite direction than the concavity of the bed from cam to cam there will be more inches in said concave than in the concave bed. Supposing, then, that the kink is eight inches, by fastening the tire with the cams D there will be an extra inch of tire, which, by pressure of the vertical foot F, is crowded into a seven-inch space, making the tire one inch shorter, and the extra inch is distributed along the seven inches from cam to cam.

The concavity of the kink is to be regulated by the amount the tire is to be shortened.

For punching holes through iron or other metal a punch, $m$, is fastened in the bottom of the foot F, and a corresponding hole is made in the bed A directly under the punch in the foot.

$n$ is a scale attached on the ledge E or back C for regulating the amount of upset.

Having thus fully described my invention, what I claim as new, and desire to secure by Letters Patent, is—

The bed A, vertical back C, provided with the serrations $a$ and serrated cam-lever D, in combination with the foot F, with side projections $d$, pins $e$, slot $x$, cam-lever G, with enlarged hole $i$, pivot-pin $h$, and spring I, substantially as herein set forth.

In testimony that I claim the foregoing as my own I affix my signature in presence of two witnesses.

CHARLES W. EDELBLUTE.

Witnesses:
SYLVESTER LEAMON,
JOHN W. GRANDSTAFF.